United States Patent
Athanasiou et al.

(10) Patent No.: US 11,052,555 B2
(45) Date of Patent: Jul. 6, 2021

(54) SYSTEM AND METHOD FOR SENSING DEBRIS ACCUMULATION IN SHAVING RAZOR CARTRIDGE

(71) Applicant: Bic Violex S.A., Anoixi (GR)

(72) Inventors: Dionysios Athanasiou, Athens (GR); Alexandra Antonakou, Athens (GR); Stavroula Kaloskami, Athens (GR); Georgios Katranas, Athens (GR); Charalampos Schizas, Athens (GR)

(73) Assignee: BIC Violex S.A., Anoixi (GR)

( * ) Notice: Subject to any disclaimer, the term of this patent is extended or adjusted under 35 U.S.C. 154(b) by 51 days.

(21) Appl. No.: 16/632,143

(22) PCT Filed: Jun. 1, 2018

(86) PCT No.: PCT/EP2018/064422
§ 371 (c)(1),
(2) Date: Jan. 17, 2020

(87) PCT Pub. No.: WO2019/015837
PCT Pub. Date: Jan. 24, 2019

(65) Prior Publication Data
US 2020/0230835 A1     Jul. 23, 2020

Related U.S. Application Data

(60) Provisional application No. 62/534,723, filed on Jul. 20, 2017.

(51) Int. Cl.
*B26B 21/40* (2006.01)
*B26B 21/52* (2006.01)
(Continued)

(52) U.S. Cl.
CPC ...... *B26B 21/4056* (2013.01); *B26B 21/4012* (2013.01); *B26B 21/4087* (2013.01);
(Continued)

(58) Field of Classification Search
CPC ............ B26B 21/4056; B26B 21/4012; B26B 21/4087; B26B 21/521; B26B 21/526; B26B 21/222; G01V 8/005; G01V 8/14
See application file for complete search history.

(56) References Cited

U.S. PATENT DOCUMENTS

2016/0167241 A1\* 6/2016 Goldfarb ................. B26B 21/28
382/108
2020/0139565 A1\* 5/2020 Panagiotopoulou ........................
B26B 21/4056
(Continued)

FOREIGN PATENT DOCUMENTS

EP      0895835 A2    2/1999

OTHER PUBLICATIONS

International Search Report issued in related International Application No. PCT/EP2018/064422, dated Sep. 20, 2018 (2 pages).

*Primary Examiner* — Omar Flores Sanchez
(74) *Attorney, Agent, or Firm* — Bookoff McAndrews, PLLC

(57) ABSTRACT

A system for determining a level of debris accumulation in a region adjacent to at least one blade of a razor cartridge. The system includes a sensing unit to detect a measurement parameter which is one of an amount of light reflected from at least one area adjacent to the at least one blade, and an image of the at least one area adjacent to the at least one blade. A processing unit compares the detected measurement parameter to at least one reference threshold parameter and determines a level of debris accumulation in the at least one area adjacent to the at least one blade based on an amount of deviation of the detected measurement parameter from the at least one reference threshold parameter. Information regarding the determined level of debris accumulation is (Continued)

provided by at least one of a light indication, an aural indication, and a haptic indication.

16 Claims, 13 Drawing Sheets

(51) Int. Cl.
*G01V 8/00* (2006.01)
*G01V 8/14* (2006.01)
*B26B 21/22* (2006.01)

(52) U.S. Cl.
CPC .......... *B26B 21/521* (2013.01); *B26B 21/526* (2013.01); *G01V 8/005* (2013.01); *G01V 8/14* (2013.01); *B26B 21/222* (2013.01)

(56) References Cited

U.S. PATENT DOCUMENTS

| | | | |
|---|---|---|---|
| 2020/0201266 A1* | 6/2020 | Joyce | A46B 13/02 |
| 2020/0202521 A1* | 6/2020 | Joyce | G06Q 30/0631 |
| 2020/0316799 A1* | 10/2020 | Tsegenidis | B26B 21/4056 |
| 2021/0122071 A1* | 4/2021 | Pintzos | G01N 21/94 |

* cited by examiner

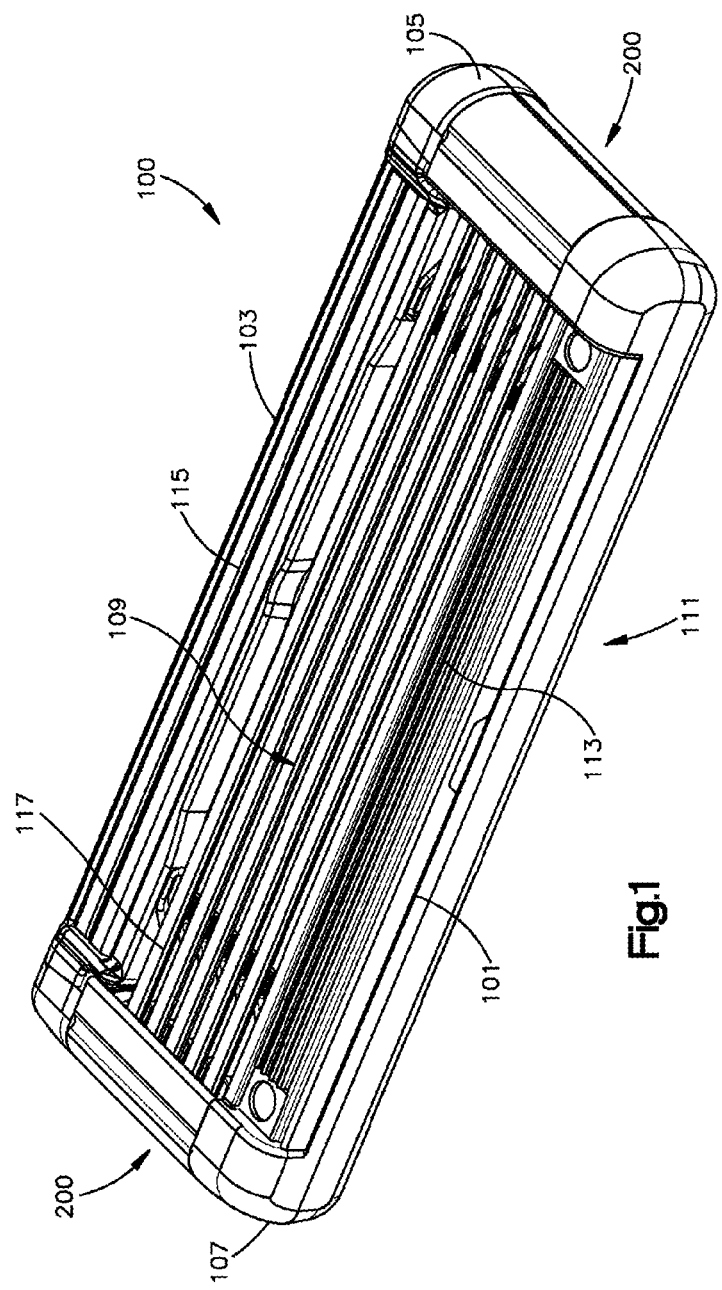

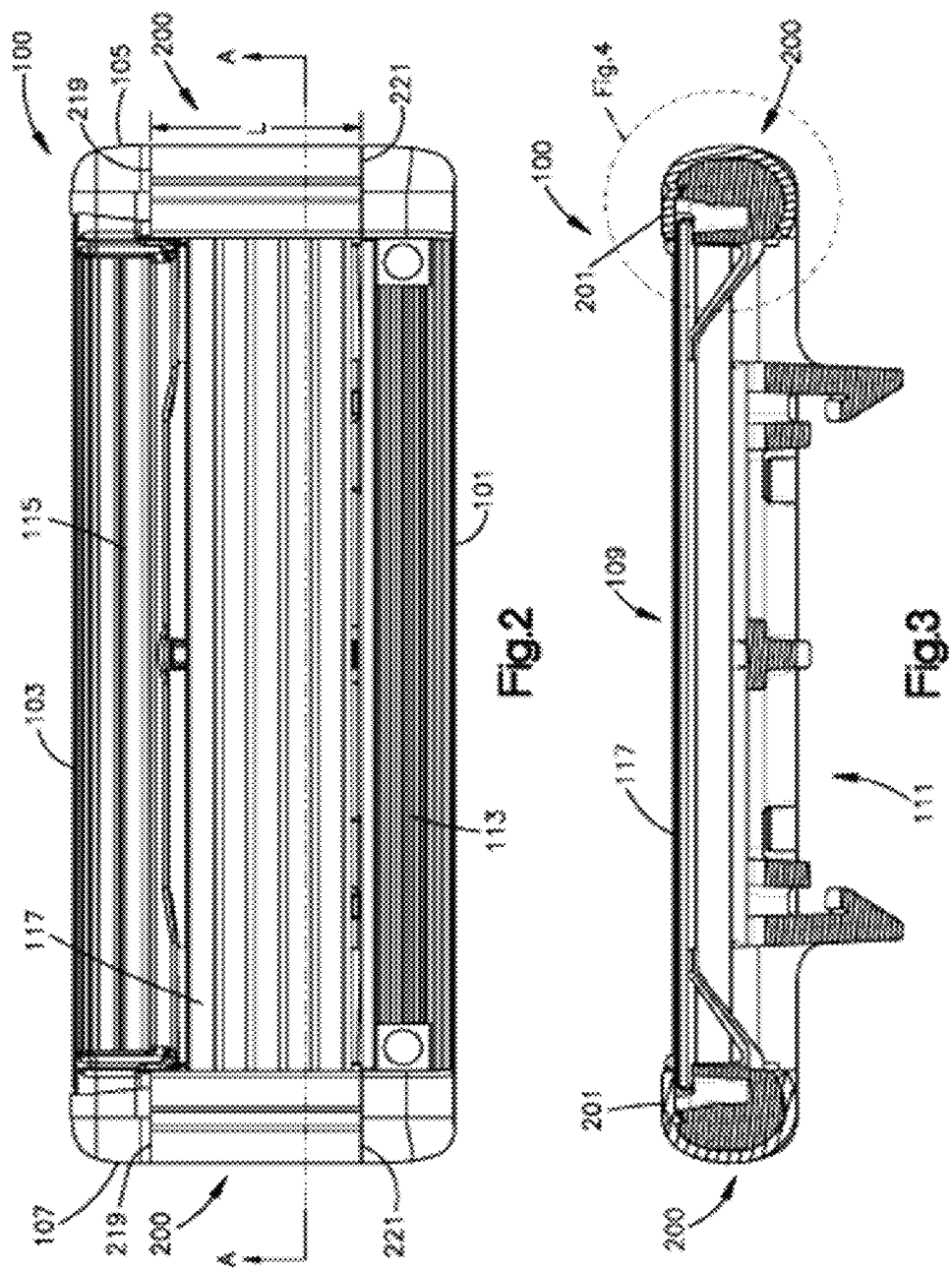

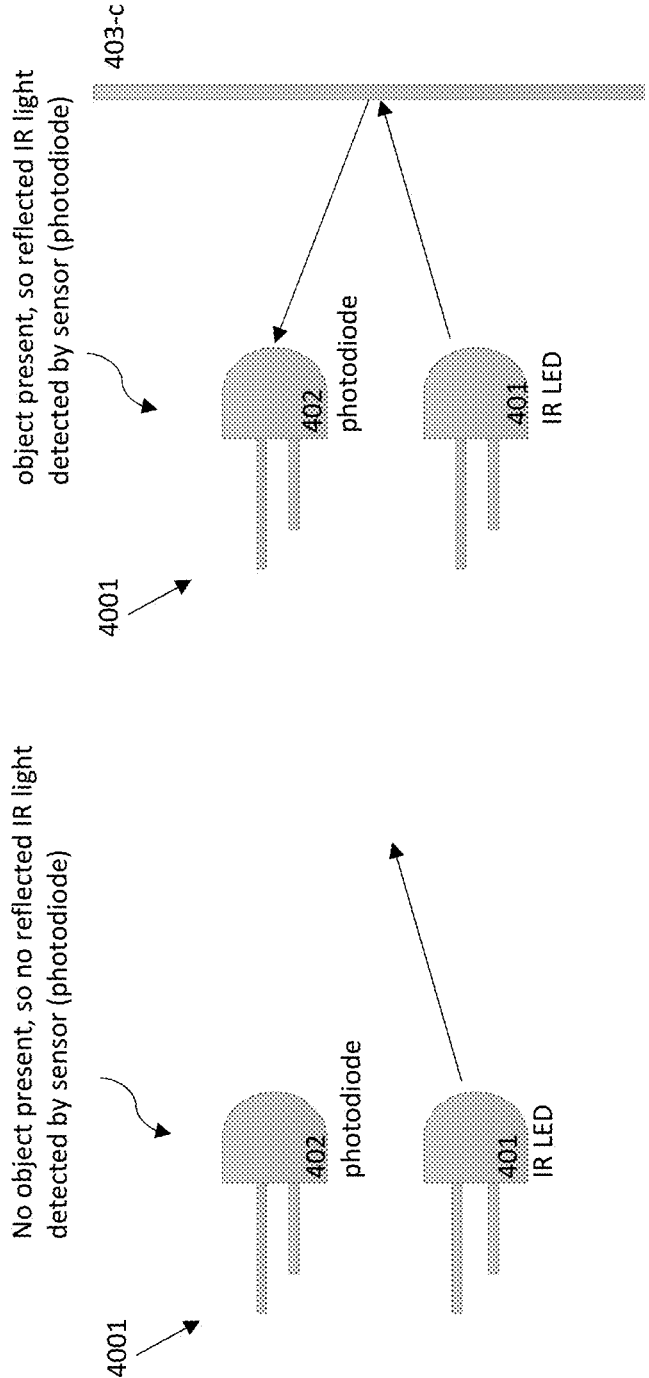

SYSTEM AND METHOD FOR SENSING DEBRIS ACCUMULATION IN SHAVING RAZOR CARTRIDGE

CROSS REFERENCE TO RELATED APPLICATIONS

This application is a National Stage Application of International Application No. PCT/EP2018/064422, filed on Jun. 1, 2018, now published as WO2019015837, which claims the benefit under 35 U.S.C. § 119(e) of U.S. Provisional Patent Application Ser. No. 62/534,723, entitled "System and Method for Sensing Debris Accumulation in Shaving Razor Cartridge," filed on Jul. 20, 2017.

BACKGROUND OF THE DISCLOSURE

1. Field of the Disclosure

The present disclosure relates to a shaving razor having a cartridge containing one or more blades. More particularly, the present disclosure relates to a system and method for determining accumulation of debris in the cartridge.

2. Description of the Related Art

A user of a shaving razor is faced with the problem of determining when too much debris has accumulated around one or more blade(s) in a razor cartridge, e.g., in the space between two adjacent blades or the space between the blades and the guard bar and/or the lubricating strip. However, it is difficult for a user to objectively determine precise level(s) of accumulation of debris in the cartridge and/or around one or more blades(s), and the user needs to rely on visual observation and/or on subjective feeling of how effective the cartridge and/or the blade is for shaving, neither of which provides an accurate, objective assessment of how much debris has accumulated. Even if a user attempts to rinse the razor cartridge with running water, it is not readily apparent to the user how effective the rinsing is after a period of time. Therefore, there is a need for a system and a method for at least (i) objectively determining precise level(s) of accumulation of debris in the cartridge and/or around one or more blades(s), and (ii) notifying a user when to rinse the cartridge and/or the blade(s), which system and method eliminate the guesswork now required.

SUMMARY

The present disclosure provides a system and a method to objectively determine one or more level(s) of accumulation of debris in a shaving cartridge and/or around one or more blades(s) of the shaving cartridge.

The present disclosure also provides a system and a method to objectively determine one or more level(s) of accumulation of debris in a shaving cartridge and/or around one or more blades(s) of the shaving cartridge by using a light-based detection system, e.g., an infrared (IR) light detection system.

The present disclosure further provides a system and a method to objectively determine one or more level(s) of accumulation of debris in a shaving cartridge and/or around one or more blades(s) of the shaving cartridge by using a light-based detection system provided in or on the shaving cartridge and/or a handle of the shaving razor.

The present disclosure still further provides a system and a method to objectively determine one or more level(s) of accumulation of debris in a shaving cartridge and/or around one or more blades(s) of the shaving cartridge by using a light-based detection system provided in or on a base unit or module that is distinct from the shaving cartridge and/or a handle of the shaving razor.

The present disclosure also provides a system and a method to objectively determine one or more level(s) of accumulation of debris in a shaving cartridge and/or around one or more blades(s) of the shaving cartridge and notify a user of the cartridge regarding the determined level(s) of accumulation of debris.

The present disclosure further provides a notification unit comprising at least one of (i) a light indication unit configured to output information regarding the determined level of accumulation of debris, (ii) an aural indication unit configured to output information regarding the determined level of accumulation of debris, and (iii) a haptic indication unit configured to output information regarding the determined level of accumulation of debris. In this manner, the user will objectively know the level of accumulation of debris.

The present disclosure still further provides a notification unit comprising at least one of (i) a light indication unit configured to output information regarding when to rinse the shaving cartridge, (ii) an aural indication unit configured to output information when to rinse the shaving cartridge, and (iii) a haptic indication unit configured to output information regarding when to rinse the shaving cartridge.

The present disclosure yet further provides a system and a method to objectively determine one or more level(s) of accumulation of debris in a shaving cartridge and/or around one or more blades(s) of the shaving cartridge so that information regarding the determined level of debris accumulation can be cumulatively collected, stored, and/or analyzed by a control and/or analysis unit to determine how quickly debris accumulates and/or how frequently the razor needs to be rinsed for a particular user.

BRIEF DESCRIPTION OF THE DRAWINGS

FIG. 1 is a perspective view of an example of a shaving cartridge.

FIG. 2 is a top view of the shaving cartridge.

FIG. 3 is a cross-sectional view of the shaving cartridge along the line A-A in FIG. 2.

FIGS. 4a-4b schematically illustrate varying light reflection depending on object darkness.

A component or a feature that is common to more than one drawing is indicated with the same reference number in each of the drawings.

DETAILED DESCRIPTION

Figure 5B:
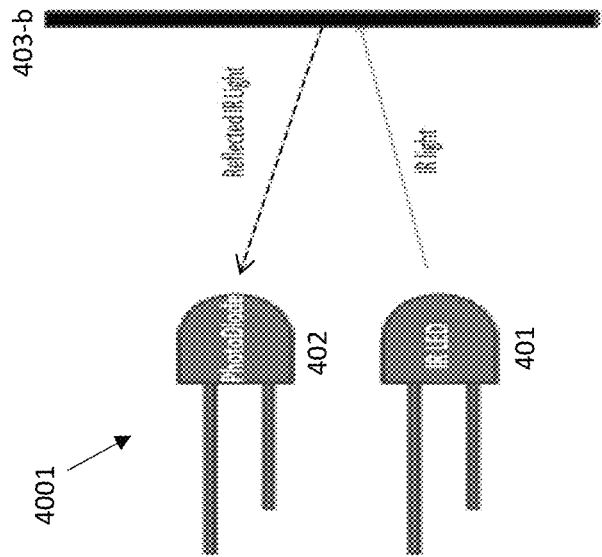
FIGS. 5a-5b schematically illustrate the principle of object detection using IR sensor.

Referring to the drawings and, in particular to FIG. 1, a shaving cartridge is shown and generally represented by reference numeral 100. Shaving cartridge 100 includes retainers 200 for securing blades 117 to shaving cartridge 100. Shaving cartridge 100 also has a housing having a front edge 101, a rear edge 103, a pair of side edges 105, 107, a top surface 109, and a bottom surface 111. The pair of side edges 105, 107 extend between front edge 101 of the housing and rear edge 103 of the housing. Shaving cartridge 100 includes a guard bar 113 adjacent to front edge 101 of the housing and a cap 115 adjacent to rear edge 103 of the housing. A lubricating element can be provided on the surface of the cap 115. One or more blades 117 are positioned between the guard bar 113 and cap 115, and retained in position in the housing using one or more retaining element(s), e.g., a pair of retainers 200 positioned in the housing. Although shaving cartridge 100 shown in FIG. 1 includes five blades 117 retained in position in the housing using a pair of retainers 200, any number of blades can be used and any number and/or type of retaining element(s), e.g., one or more retaining clips, can be provided at suitable location(s) to retain the blade(s) in position.

Referring to FIGS. 2-3, retainers 200 are spaced apart and positioned on opposite sides of the housing. Retainers 200 extend along side edges 105 and 107 of the housing and include a top portion 201 that extends above top surface 109 of the housing and above one or more blades 117 to retain the position of blades 117 in the housing. Retainers 200 can be made of metal, and retainers 200 physically contact blades 117, so that retainers 200 and one or more of the blades can form an electrical path.

In this example, retainers 200 extend along a length L on side edges 105 and 107 of about 8.5 mm, for example. However, it should be appreciated that retainers 200 can extend along a shorter or longer portion of side edges 105 and 107. For example, a pair of retainers 200 can each extend along the entire length, a shorter portion, or a longer portion of side edges 105 and 107. Such extensions can secure in place a guard bar, a cap element, or a trimmer assembly, for example. In addition, as noted above, any number of retainers can be used with shaving cartridge 100. For example, a single retainer or four retainers can be used to retain the position of blades 117 in the housing.

FIGS. 4a-4b illustrate a principle of object detection using an infrared (IR) light detection sensor 4001. As shown in FIGS. 4a and 4b, IR sensor 4001 can include an IR LED emitter 401 for emitting IR light, and a photodiode 402 for detecting any reflected IR light. As shown in FIG. 4a, when no object is present in the path of IR light emitted by IR LED 401, no reflected IR light is detected by photodiode 402. As shown in FIG. 4b, when an object is present in the path of IR light emitted by IR LED 401, IR light reflected by the object 403-c is detected by photodiode 402.

Figure 5A:
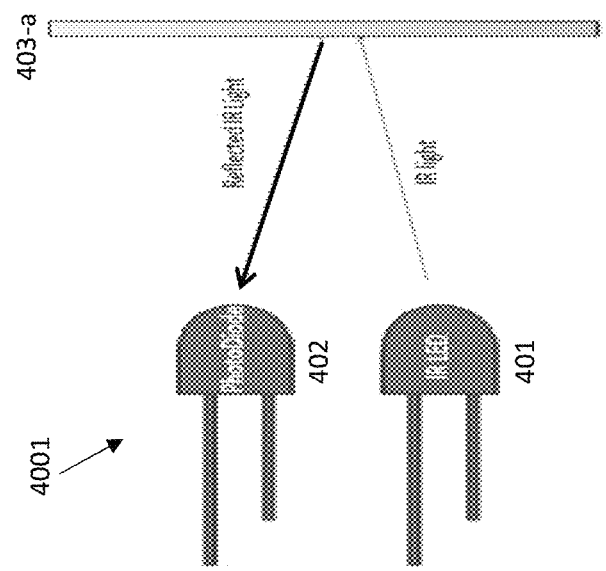

FIGS. 5a-5b illustrate varying amounts of reflected IR light detected by IR sensor 4001. As shown in FIGS. 5a and 5b, IR light emitted by IR LED 401 is reflected by an object 403-a (FIG. 5a) and object 403-b (FIG. 5b), respectively, and the reflected IR light is detected by photodiode 402. Because the object 403-a shown in FIG. 5a is lighter in color (or darkness) in comparison to the object 403-b shown in FIG. 5b, the amount of IR light reflected by the object 403-a is greater than the amount of IR light reflected by the object 403-b, and photodiode 402 detects the varying amounts of reflected IR light.

When shaving cartridge 100 having at least one blade 117 provided between guard bar 113 adjacent to front edge 101 of the housing and cap 115 adjacent to rear edge 103 of the housing is used for shaving, the region surrounding the at least one blade 117, e.g., (i) a region between the at least one blade 117 and at least one of guard bar 113 and cap 115, or (ii) a region between the at least one blade 117 and at least one more blade 117 (if two or more blades 117 are provided), is subjected to debris accumulation, e.g., hair, residuals of products for the shaving preparation (e.g. shaving cream, shaving foam, shaving gel, shaving oil etc.), dead skin cells and/or lubricant emitted from a lubrication element provided on shaving cartridge 100. According to the present disclosure, systems and methods are provided to advantageously implement (i) objective determination of multiple levels of debris accumulation, and (ii) provide notifications to the user regarding the multiple levels of wear, and (iii) provide notifications to the user when to rinse shaving cartridge 100 and/or the at least one blade 117. The level of debris accumulation can be determined in several ways.

In one example method, an amount of debris accumulation in a region surrounding the at least one blade 117, e.g., (i) a region between the at least one blade 117 and at least one of guard bar 113 and cap 115, or (ii) a region between the at least one blade 117 and at least one more blade 117 (if two or more blades 117 are provided), can be detected by a sensor based on an amount of IR light reflected by the region surrounding the at least one blade 117 and detected by the sensor. By comparing the detected amount of IR light reflected by the region surrounding the at least one blade 117 to one or more predefined reference thresholds, one or more levels of debris accumulation can be detected by the sensor.

In one embodiment, a light sensor, e.g., an IR light sensor of the type described in connection with FIGS. 4a-4b and 5a-5b, and located in or on shaving cartridge 100, or located in or on a handle to which the cartridge is attached, can be used for this purpose. In addition, other locations and/or sensor arrangements for the debris accumulation detection can be implemented. For example, the light sensor can be provided in or on a base unit separate from the shaver. In another example embodiment, an image sensor can be provided to implement the detection of debris accumulation. The image sensor can be provided, e.g., (i) in or on the shaving cartridge 100, (ii) in or on a handle to which the cartridge is attached, or (iii) in or on the base unit. For each of these example embodiments, the detected and/or measured level of accumulation of debris can be stored in a storage element in shaving cartridge 100 or the handle, and/or can be transmitted (e.g., via a wired or wireless connection) to, and/or stored in, the base unit. The embodiments, however, are not limited to these examples.

Figure 6A:
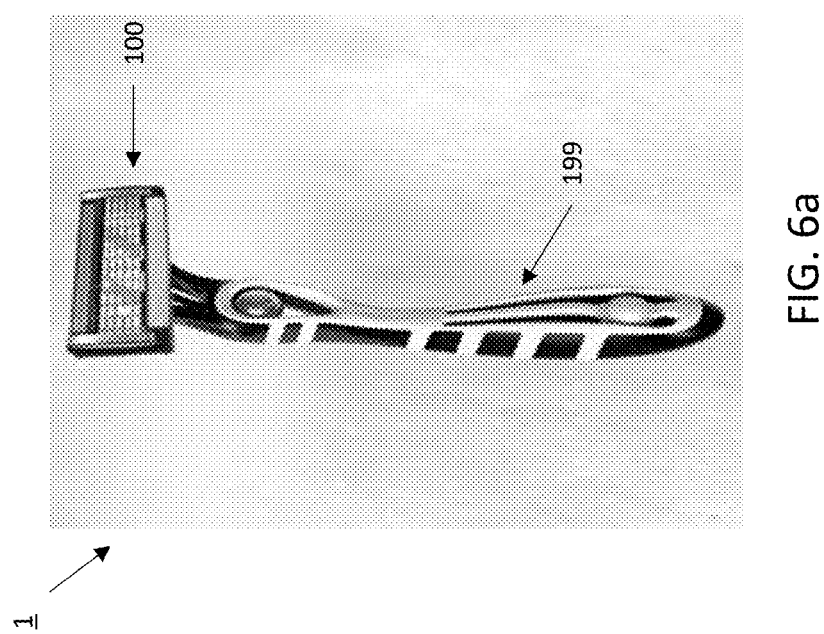
FIG. 6a is a perspective view of a razor having a handle and a cartridge.

FIG. 6a is an example razor 1 having a handle 199 and a cartridge 100. In another embodiment, various components (including electric and/or electronic components) and circuitry can be provided in or on the razor to implement various aspects of the present disclosure, as shown in FIGS. 6b and 6c.

Figure 6B:
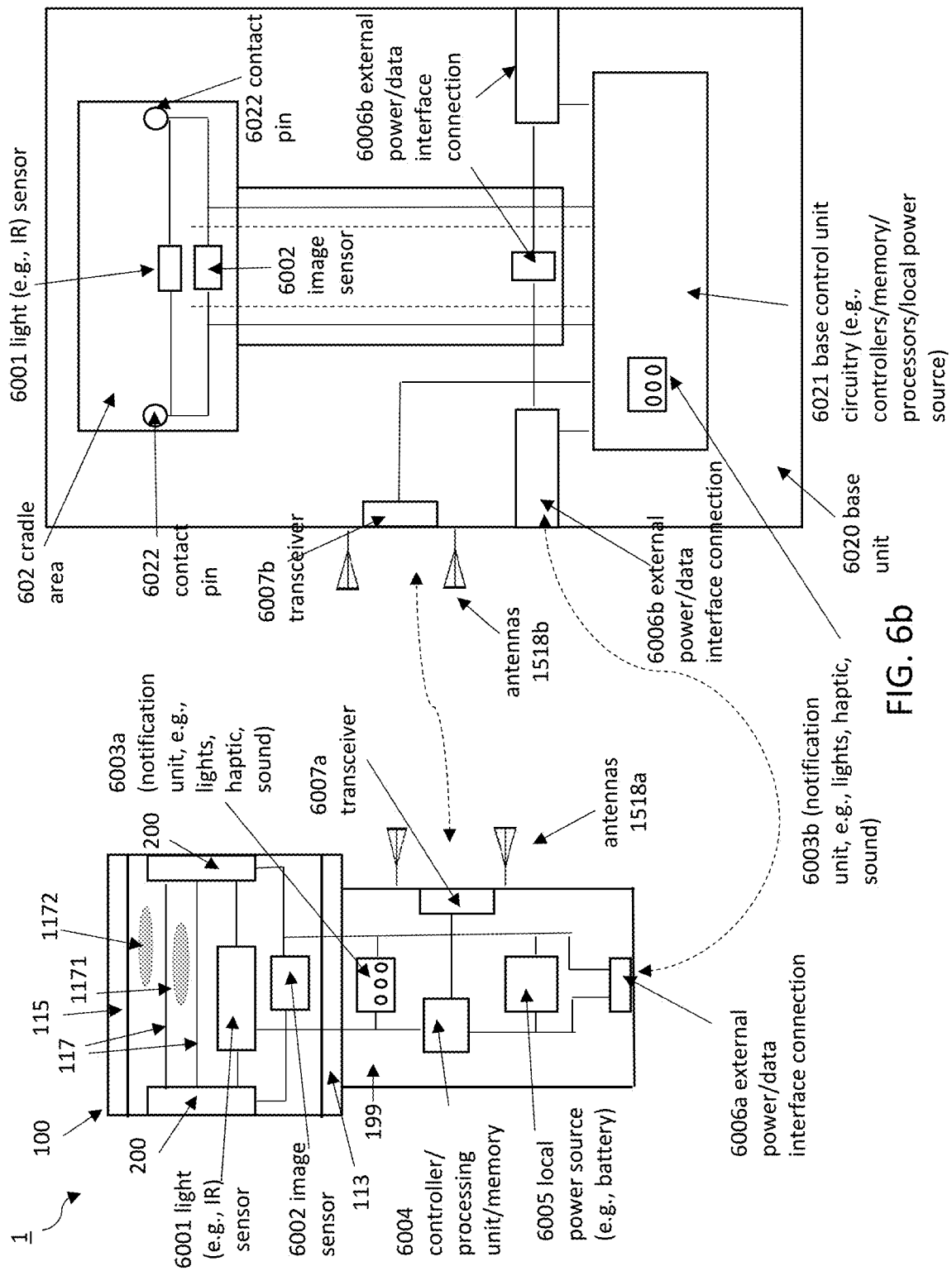
FIG. 6b is a schematic showing various electric/electronic components of a razor and an external base module, as well as communication paths between the razor and the base module, according to an embodiment of the present disclosure.
Figure 6C:
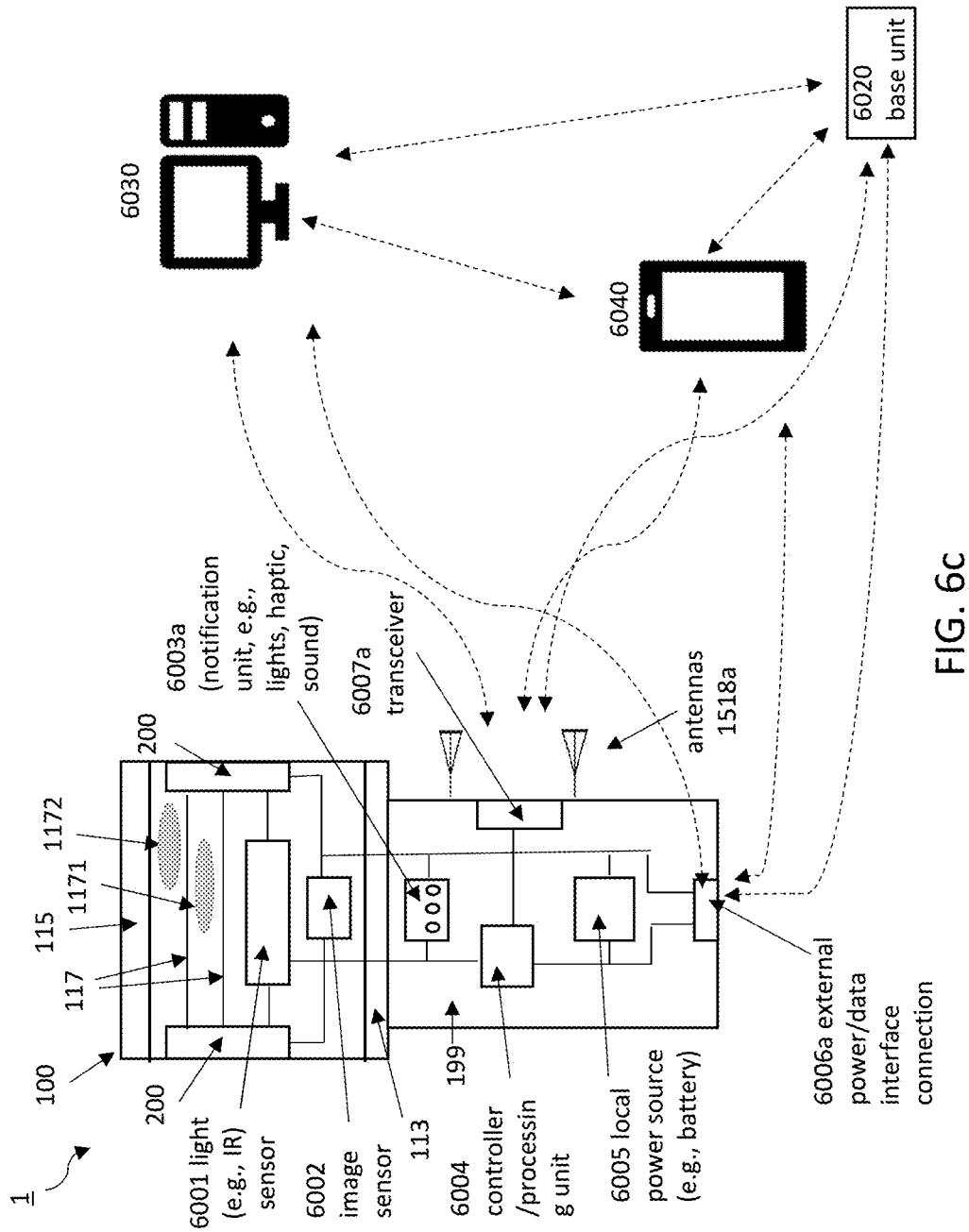
FIG. 6c is a schematic showing various electric/electronic components of a razor, as well as communication paths between the razor and external devices, according to an embodiment of the present disclosure.

FIG. 6b illustrates various examples of (i) electric and/or electronic components of a razor 1 (shown on the left side of FIG. 6b) having a cartridge 100 and a handle 199, (ii) electric and/or electronic components of an external base module or unit 6020 (shown on the right side of FIG. 6b), and (iii) as well as various connection and communication paths between the razor 1 and base module or unit 6020, according to an embodiment.

Razor 1, illustrated in FIG. 6b, includes the following exemplary components that are electrically and/or communicatively connected: a light sensor 6001, which can be an IR light sensor of the type described in connection with FIGS. 4a-4b and 5a-5b; an image sensor 6002, which can be provided in addition to, or alternative to, light sensor 6001; a notification unit 6003a, which can be configured to generate a visual (e.g., lights), haptic and/or sound notification; a control unit 6004, which can be configured to include a controller, a processing unit and/or a memory; a local power source 6005 (e.g., battery); an interface unit 6006a, which can be configured as an interface for external power connection and/or external data connection; a transceiver unit 6007a for wireless communication; and antennas 1518a. Light sensor 6001 is configured to measure an amount of light (e.g., IR light) reflected by a region surrounding the at least one blade 117, e.g., (i) region 1172 between the at least one blade 117 and cap 115 (or between the at least one blade 117 and the guard bar 113), and/or (ii) region 1171 between the at least one blade 117 and at least one more blade 117 (if two or more blades 117 are provided). By comparing the detected amount of light (e.g., IR light) reflected by region 1171 and/or region 1172 surrounding the at least one blade 117 to one or more predefined reference thresholds, one or more levels of debris accumulation can be detected by the sensor. In addition, image sensor 6002 is configured to detect an image of region 1171 and/or region 1172, and by comparing the amount of debris accumulation shown in the detected image to one or more predefined reference levels of debris accumulation, one or more levels of debris accumulation may be detected.

Control unit 6004 receives and processes the information output from light sensor 6001 and/or image sensor 6002 to determine the level of debris accumulation in a region surrounding the at least one blade 117, e.g., region 1171 and/or region 1172. For example, control unit 6004 can compare the detected amount of light (e.g., IR light) reflected by region 1171 and/or region 1172 to a reference threshold level of light. Control unit 6004 can determine the level of debris accumulation based on an amount of deviation of the detected amount of reflected light from the reference threshold level(s) of reflected light. For example, a first reference threshold level of reflected light may correspond to a completely debris-free condition of region 1171 and/or region 1172. For the purposes of this example, it will be assumed that a completely debris-free condition corresponds to a condition in which the light emitted by sensor 6001 is reflected by a light-color object (e.g., the condition depicted in FIG. 5a). A second reference threshold level of reflected light may correspond to a condition of region 1171 and/or region 1172 in which 33% of region 1171 and/or region 1172 is filled with debris. A third reference threshold level of reflected light may correspond to a condition of region 1171 and/or region 1172 in which 66% of region 1171 and/or region 1172 is filled with debris. A fourth reference threshold level of reflected light may correspond to a completely debris-filled condition of the region 1171 and/or region 1172. As the amount of debris in the region 1171 and/or region 1172 increases, region 1171 and/or 1172 will become darker, and the amount of light reflected by region 1171 and/or 1172 will correspondingly decrease (as shown in FIGS. 5a and 5b).

Alternatively, or in addition, control unit 6004 can analyze the detected image (as detected by image sensor 6002) of region 1171 and/or region 1172, and by comparing the amount of debris accumulation shown in the detected image to one or more predefined reference levels of debris accumulation, control unit 6004 can determine the level of debris accumulation based on an amount of deviation of the debris accumulation shown in the detected image to one or more predefined reference threshold level(s) of debris accumulation. For example, a first reference threshold level may correspond to a completely debris-free condition of region 1171 and/or region 1172. A second reference threshold level may correspond to 33% of region 1171 and/or region 1172 filled with debris. A third reference threshold level may correspond to 66% of region 1171 and/or region 1172 filled with debris. A fourth reference threshold level may correspond to a completely debris-filled condition of region 1171 and/or region 1172. These examples are not limiting.

Control unit 6004 can provide information regarding the determined level of debris accumulation in a region surrounding the at least one blade 117 to notification unit 6003a, which in turn can generate output signal(s) corresponding to the determined level(s) of debris accumulation by at least one of (i) a light indication (e.g., using different colored LED lights), (ii) an aural indication (e.g., using different sound levels and/or patterns), and/or (iii) a haptic indication (e.g., using different haptic intensity and/or patterns). In an example embodiment, each of these forms of indication can indicate, e.g., three different levels of debris accumulation: a first level corresponding to 0-33% debris accumulation of region 1171 and/or region 1172; a second level corresponding to 34-66% debris accumulation of region 1171 and/or region 1172; and a third level corresponding to 67-100% debris accumulation of region 1171 and/or region 1172. In this example embodiment, either the indication corresponding to the second level of debris accumulation or the indication corresponding to the third level of debris accumulation can be used as an indication to the user of shaving cartridge 100 to rinse the cartridge. In an alternative example embodiment, a single ON/OFF "rinse" indication can be provided, either in addition to, or alternatively to, the above-described three different levels of debris accumulation, using the at least one of the light, aural and haptic indication. In this alternative example, a level of debris accumulation corresponding to 50-100% debris accumulation of region 1171 and/or region 1172 would be indicated by the "rinse" indication being turned ON. These examples are not limiting.

Control unit 6004 can cumulatively collect and/or store the information regarding the determined level of debris accumulation to analyze and determine the rate of debris accumulation. In addition, control unit 6004 can analyze the rate of debris accumulation in conjunction with data provided by a user or data from a database regarding particular skin properties and/or hair properties, thereby enabling customized analysis and data collection of an individual user's razor use.

The information output from light sensor 6001 and image sensor 6002, and/or the information regarding the determined level of debris accumulation in an area surrounding the at least one blade 117, can be transmitted (i) wirelessly via the transceiver 6007*a* or (ii) via a wired connection through interface unit 6006*a* for external power/data connection, to base module or unit 6020 which is external to razor 1. As shown in FIG. 6*b*, base module or unit 6020 includes, for example, the following components: base control unit circuitry 6021, which can include controller(s), memory, processing unit(s), and a local power source (e.g., battery); a light sensor 6001 in a cradle area 602 and, either alternatively to or in addition to sensor 6001, an image sensor 6002 in cradle area 602; two contact pins 6022 in cradle area 602; a notification unit 6003*b*, which can be configured to generate a visual (e.g., three different colored LED lights corresponding to different levels of wear, as described above), haptic and/or sound notification; one or more interface unit(s) 6006*b*, which can be configured as an interface for external power connection and/or external data connection; a transceiver unit 6007*b* for wireless communication; and antennas 1518*b*.

Base module or unit 6020 can be used in conjunction with razor 1 in multiple ways. In a first example, information received (e.g., via a hard-wired connection through interface 6006*b* or wirelessly via transceiver 6007*b*) from razor 1 (e.g., information output from light sensor 6001 and/or image sensor 6002, and/or the information regarding the determined level of debris accumulation in an area surrounding the at least one blade) can be used, e.g., by base control unit circuitry 6021, to indicate the determined level of debris accumulation by an output via notification unit 6003*b*.

In a second example, information received (e.g., via a hard-wired connection through interface 6006*b* or wirelessly via transceiver 6007*b*) from razor 1 (e.g., information output from light sensor 6001 and/or image sensor 6002, and/or the information regarding the determined level of debris accumulation in an area surrounding the at least one blade) can be cumulatively collected, stored, and/or analyzed by base control unit circuitry 6021 of base module or unit 6020 to determine the rate of debris accumulation for shaving cartridge 100 and/or the at least one blade 117 so as to require rinsing. In addition, base control unit circuitry 6021 of base module or unit 6020 can analyze the rate of debris accumulation in conjunction with data provided by a user or data from a database regarding particular skin properties and/or hair properties, thereby enabling customized analysis and/or data collection of an individual user's razor use.

In a third example, base module or unit 6020 can be used to make the light detection and/or the image detection directly, instead of the light detection and/or the image detection being performed by the components of razor 1. For the direct measurement by base module or unit 6020, shaving cartridge 100 is placed in cradle area 602 of base module or unit 6020. In one example embodiment, retainers 200 of shaving cartridge 100 can be placed in electrical contact with contact pins 6022 of base unit or module 6020, thereby enabling detection of the presence of shaving cartridge 100 in cradle 602. Light sensor 6001 of base module or unit 6020 detects the reflected light (in the case of light sensor 6001) from region 1171 and/or region 1172 of shaving cartridge 100, and/or image sensor 6002 of base module or unit 6020 detects the image of region 1171 and/or region 1172, as described above in connection with light sensor 6001 and image sensor 6002 provided in razor 1. Base control unit circuitry 6021 can process and compare the detected reflected light level and/or the detected image to the specified reference threshold level(s) to determine the level of debris accumulation in region 1171 and/or region 1172, and the determined level of debris accumulation can be indicated by an output via notification unit 6003*b*, as discussed above in connection with the corresponding processing performed in razor 1.

FIG. 6*c* illustrates alternate embodiments of external devices that can be used instead of, or in conjunction with, base unit or module 6020. In one example, information from razor 1 (e.g., information output from light sensor 6001 and/or image sensor 6002, and/or the information regarding the determined level of debris accumulation in a region surrounding the at least one blade 117) can be transmitted, e.g., via a hard-wired connection through interface 6006*b* or wirelessly via transceiver 6007*b*, to a mobile device 6040, which may be provided with a processing unit and clients (e.g., one or more application software) that perform some or all of the functionalities performed by base unit or module 6020 shown in FIG. 6*b*, as well as additional functionalities, e.g., further analysis and/or added service such as automated ordering of replacement cartridges via the Internet. In another example, information from razor 1 (e.g., information output from light sensor 6001 and/or image sensor 6002, and/or the information regarding the determined level of debris accumulation in a region surrounding the at least one blade 117) can be transmitted, e.g., via a hard-wired connection through interface 6006*b* or wirelessly via transceiver 6007*b*, to a computer 6030, which may be provided with a processing unit and clients (e.g., one or more application software) that perform some or all of the functionalities performed by base unit or module 6020 shown in FIG. 6*b*, as well as additional functionalities, e.g., further analysis and/or added service such as automated ordering of replacement cartridges via the Internet. In another example, information and/or processing of information can be shared among razor 1, base unit or module 6020, computer 6030, and mobile device 6040.

Figure 7:
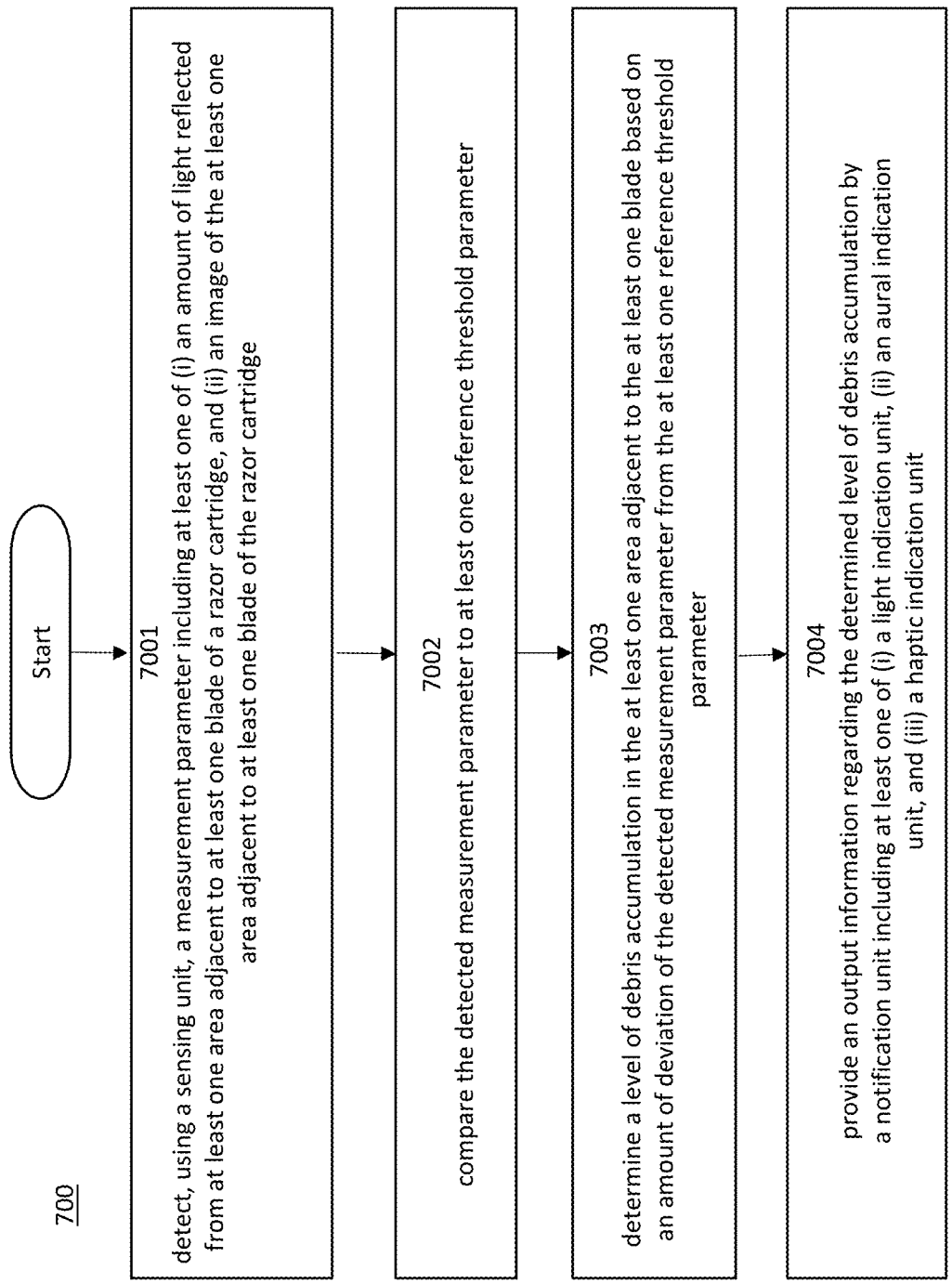
FIG. 7 is a logic flow chart of a method for determining a level of wear of at least one blade of a razor according to an embodiment herein.

FIG. 7 illustrates a logic flow of a method for determining a level of debris accumulation in a region adjacent to at least one blade of a razor according to an embodiment. At block 7001, a measurement parameter is detected using a sensing unit (e.g., light sensor 6001 and/or image sensor 6002), the measurement parameter including at least one of (i) an amount of light (e.g., IR light) reflected from at least one area (e.g., region 1171 and/or region 1172) adjacent to at least one blade 117 of a razor or razor cartridge 100, and (ii) an image of the at least one area (e.g., region 1171 and/or region 1172) adjacent to at least one blade 117 of razor cartridge 100. At block 7002, the detected measurement parameter is compared to at least one reference threshold parameter, e.g., by control unit 6004 and/or base control unit circuitry 6021. At block 7003, a level of debris accumulation in the at least one area (e.g., region 1171 and/or region 1172) adjacent to the at least one blade is determined, e.g., by control unit 6004 and/or base control unit circuitry 6021, based on an amount of deviation of the detected measurement parameter from the at least one reference threshold parameter. At block 7004, output information regarding the determined level of debris accumulation is provided by a notification unit (e.g., 6003*a*) including at least one of (i) a light indication unit, (ii) an aural indication unit, and (iii) a haptic indication unit.

Figure 8:
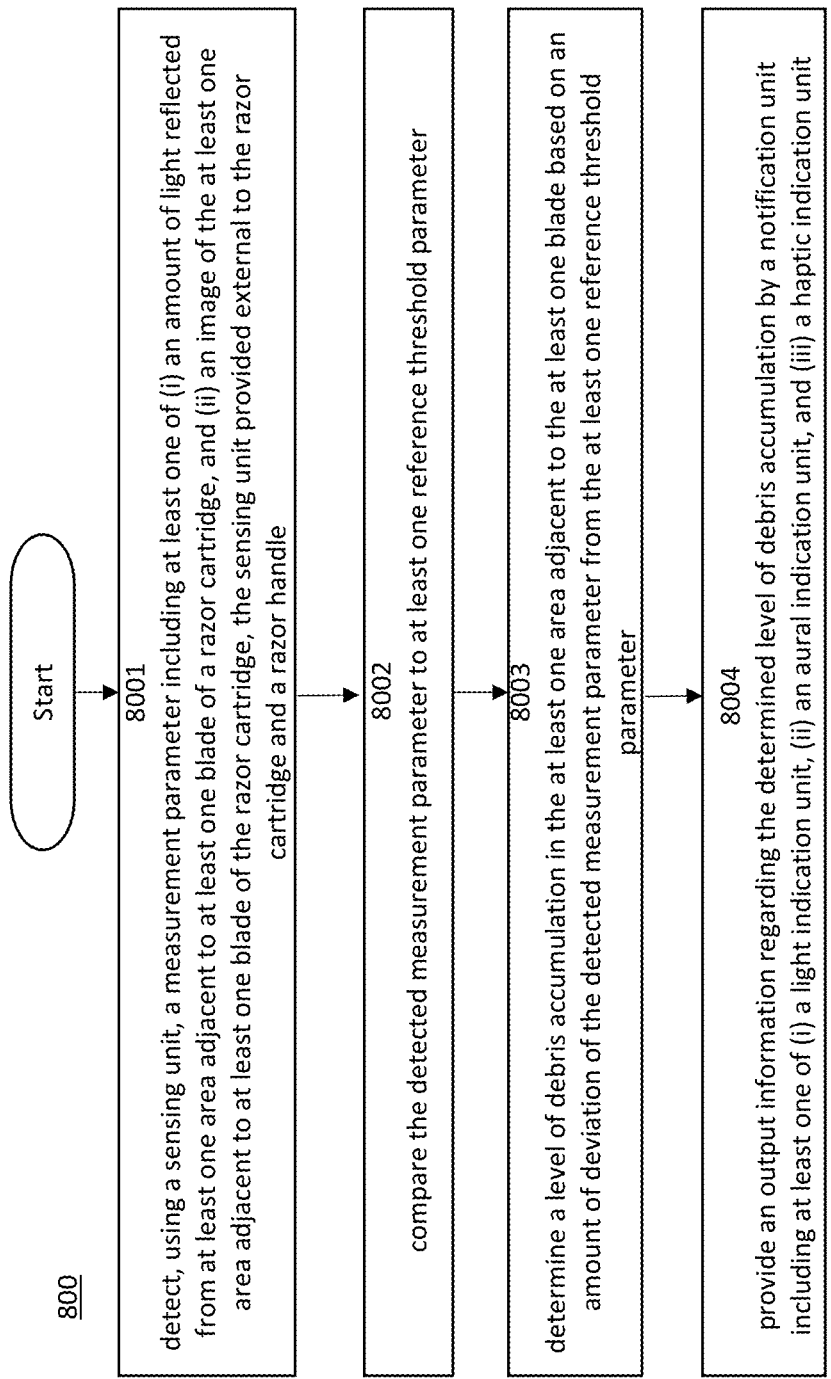
FIG. 8 is a logic flow chart of a method for determining a level of wear of at least one blade of a razor according to an embodiment herein.

FIG. 8 illustrates a logic flow of an example method for determining a level of debris accumulation in a region adjacent to at least one blade of a razor according to an embodiment of the present disclosure. At block 8001, a measurement parameter is detected using a sensing unit provided external to the razor cartridge and a razor handle (e.g., light sensor 6001 and/or image sensor 6002 in or on base unit or module 6020), the measurement parameter including at least one of (i) an amount of light (e.g., IR light)

reflected from at least one area (e.g., region 1171 and/or region 1172) adjacent to at least one blade 117 of a razor cartridge 100, and (ii) an image of the at least one area (e.g., region 1171 and/or region 1172) adjacent to at least one blade 117 of razor cartridge 100. At block 8002, the detected measurement parameter is compared to at least one reference threshold parameter, e.g., by base control unit circuitry 6021. At block 8003, a level of debris accumulation in the at least one area (e.g., region 1171 and/or region 1172) adjacent to the at least one blade is determined, e.g., by base control unit circuitry 6021, based on an amount of deviation of the detected measurement parameter from the at least one reference threshold parameter. At block 8004, output information regarding the determined level of debris accumulation is provided by a notification unit (e.g., 6003*a*) including at least one of (i) a light indication unit, (ii) an aural indication unit, and (iii) a haptic indication unit.

Figure 9:
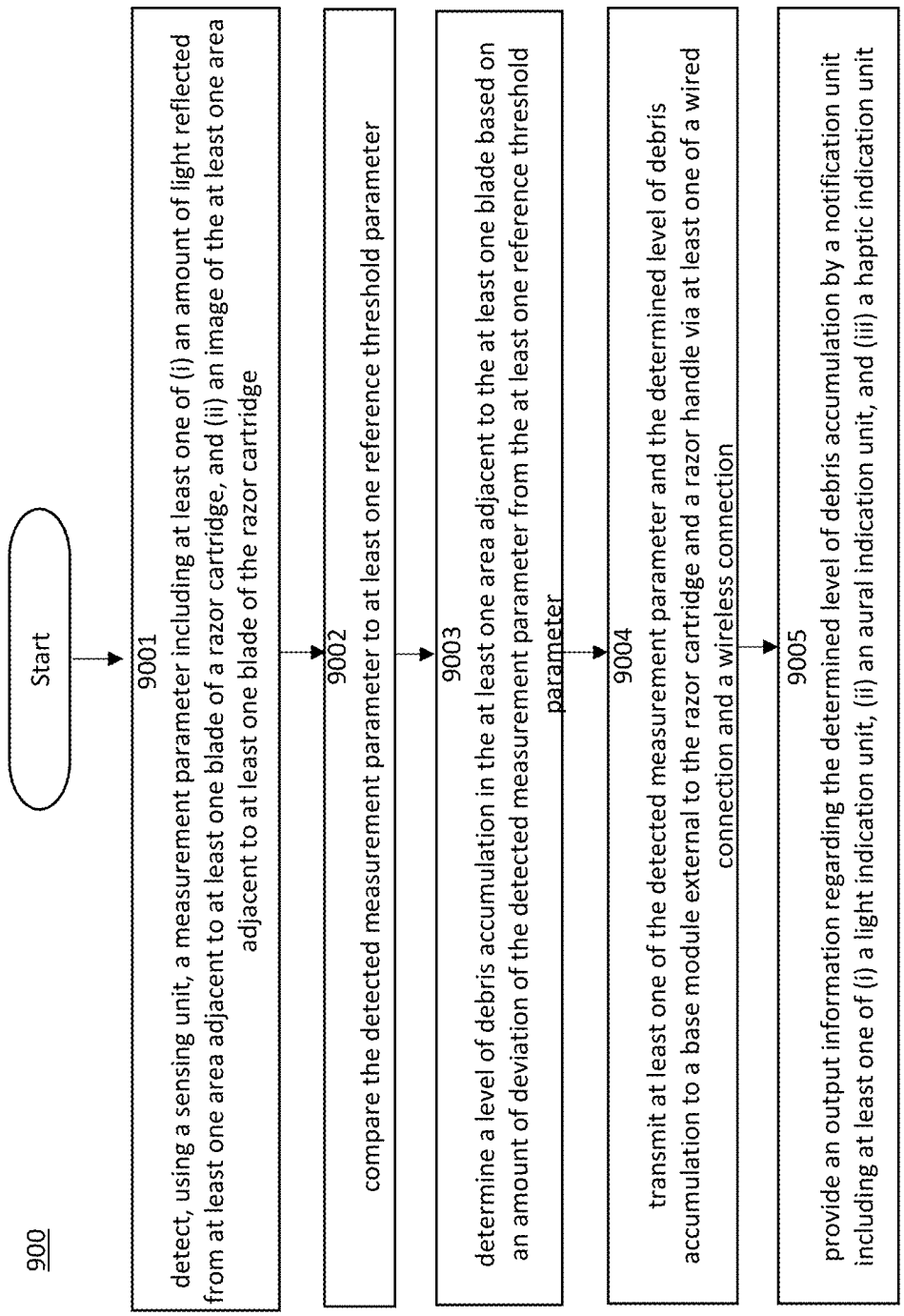
FIG. 9 is a logic flow chart of a method for determining a level of wear of at least one blade of a razor according to an embodiment herein.

FIG. 9 illustrates a logic flow of a method for determining a level of debris accumulation in a region adjacent to at least one blade of a razor according to an embodiment of the present disclosure. At block 9001, a measurement parameter is detected using a sensing unit (e.g., light sensor 6001 and/or image sensor 6002), the measurement parameter including at least one of (i) an amount of light (e.g., IR light) reflected from at least one area (e.g., region 1171 and/or region 1172) adjacent to at least one blade 117 of a razor cartridge 100, and (ii) an image of the at least one area (e.g., region 1171 and/or region 1172) adjacent to at least one blade 117 of razor cartridge 100. At block 9002, the detected measurement parameter is compared to at least one reference threshold parameter, e.g., by control unit 6004 and/or base control unit circuitry 6021. At block 9003, a level of debris accumulation in the at least one area (e.g., region 1171 and/or region 1172) adjacent to the at least one blade is determined, e.g., by control unit 6004 and/or base control unit circuitry 6021, based on an amount of deviation of the detected measurement parameter from the at least one reference threshold parameter. At block 9004, at least one of the detected measurement parameter and the determined level of debris accumulation is transmitted to a base module (e.g., base unit 6020, computer 6030 and/or mobile device 6040) external to the razor cartridge and a razor handle via at least one of a wired connection and a wireless connection. At block 9005, output information regarding the determined level of debris accumulation is provided by a notification unit (e.g., 6003*a*) including at least one of (i) a light indication unit, (ii) an aural indication unit, and (iii) a haptic indication unit.

Figure 10:
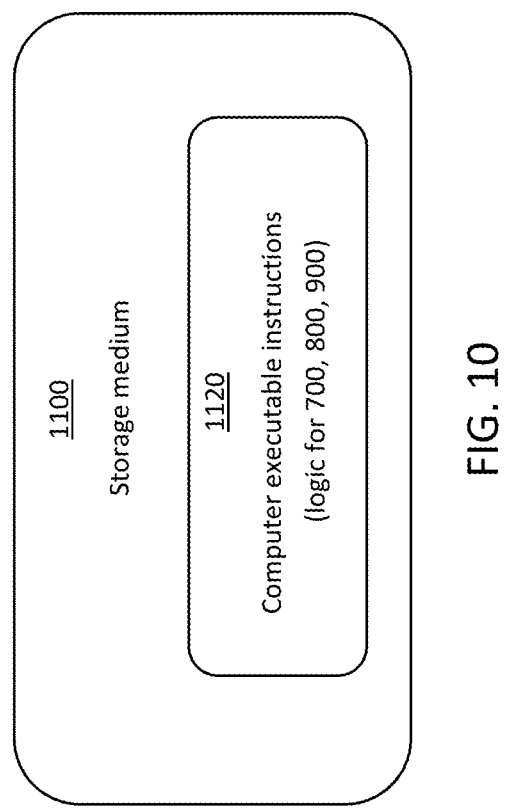
FIG. 10 is a computer-readable storage medium according to an embodiment herein.

FIG. 10 illustrates an embodiment of a storage medium 1100, which can comprise an article of manufacture, e.g., storage medium 1100 can include any non-transitory computer readable medium or machine-readable medium, such as an optical, magnetic or semiconductor storage. Storage medium 1100 can store various types of computer executable instructions, e.g., 1120. For example, storage medium 2000 can store various types of computer executable instructions to implement techniques 700, 800, and 900. Further, such instructions can be executed by, e.g., control unit 6004, base unit circuitry 6021, computer 6030 and/or mobile device 6040, to carry out the techniques described herein.

Some examples of a computer readable storage medium or machine-readable storage medium can include tangible media capable of storing electronic data, e.g., volatile memory or non-volatile memory, removable or non-removable memory, erasable or non-erasable memory, writeable or re-writeable memory, etc. Some examples of computer-executable instructions can include suitable type of code, e.g., source code, compiled code, interpreted code, executable code, static code, dynamic code, object-oriented code, visual code, and the like. The examples are not limited in this context.

Figure 11:
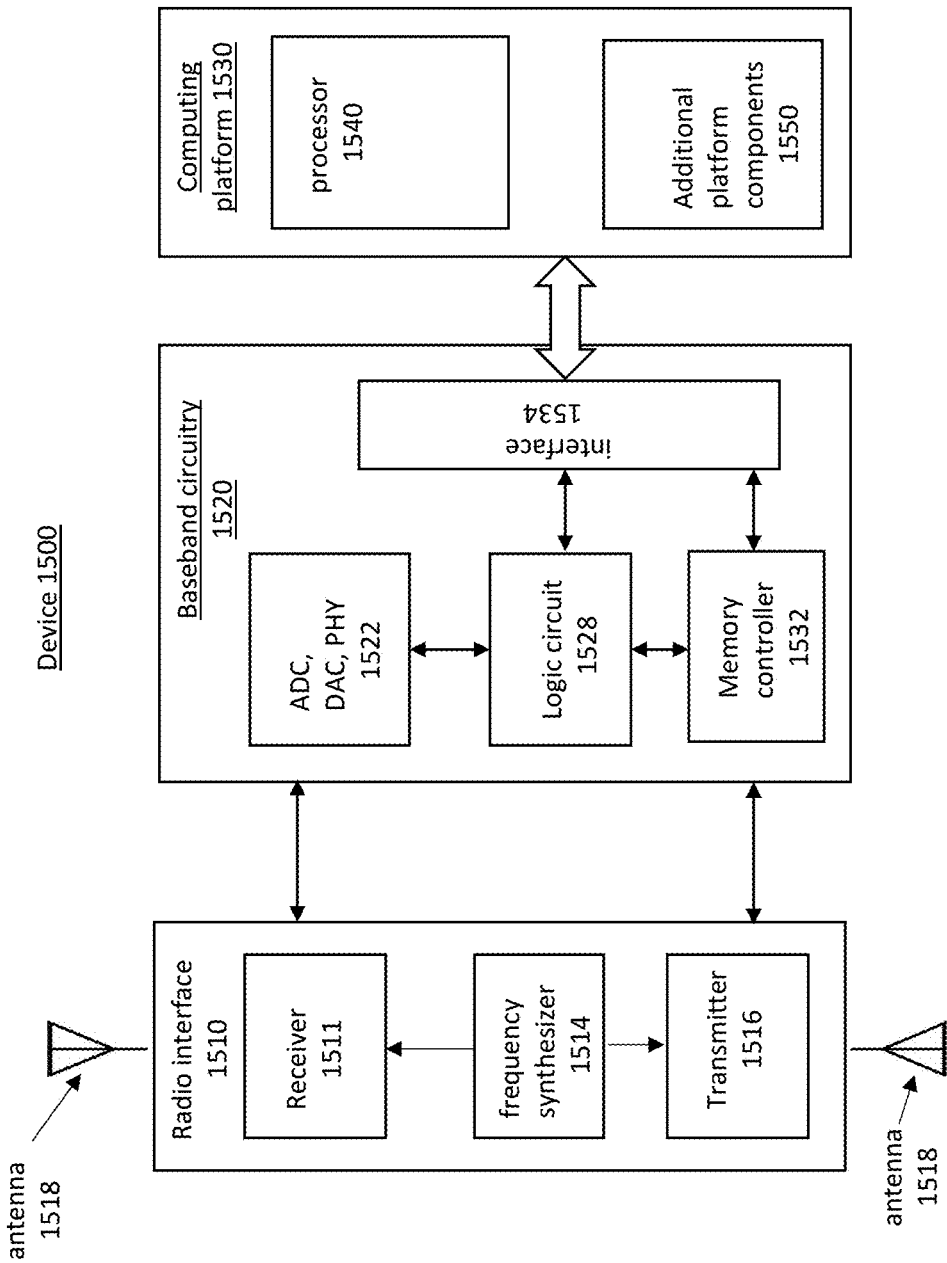
FIG. 11 is an embodiment of a communication device for implementing one or more logic flows herein.

FIG. 11 illustrates an embodiment of a communications device 1500 which can implement one or more of logic flow 700, logic flow 800, and logic flow 900, storage medium 1100, the computer 6030, the mobile device 6040, one or more functionalities of the circuitry of razor 1, and one or more functionalities of base unit 6020, according to one or more embodiments. In an example embodiment, communication device 1500 can comprise a logic circuit 1528 which can include physical circuits to perform operations described for one or more of logic flow 700, logic flow 800, and logic flow 900, for example. In addition, communication device 1500 can include a radio interface 1510, baseband circuitry 1520, and computing platform 1530. However, the embodiments are not limited to this example configuration.

Communication device 1500 can implement some or all of the structure and/or operations for one or more of logic flow 700, logic flow 800, and logic flow 900, storage medium 1100, computer 6030, mobile device 6040, one or more functionalities of the circuitry of razor 1, one or more functionalities of base unit 6020, and logic circuit 1528 in (i) a single computing entity, e.g., a single device, or (ii) in a distributed manner. In the latter case, communication device 1500 can distribute portions of the structure and/or operations for one or more of logic flow 700, logic flow 800, and logic flow 900, storage medium 1100, computer 6030, mobile device 6040, one or more functionalities of base unit 6020, and logic circuit 1528 across multiple computing platforms and/or entities using a distributed system architecture, e.g., a master-slave architecture, a client-server architecture, a peer-to-peer architecture, a shared database architecture, and the like. The embodiments are not limited in this context.

In an example embodiment, radio interface 1510 can include one or more component(s) adapted to transmit and/or receive single-carrier or multi-carrier modulated signals such as CCK (complementary code keying), OFDM (orthogonal frequency division multiplexing), and/or SC-FDMA (single-carrier frequency division multiple access) symbols. Radio interface 1510 can include, e.g., a receiver 1511, a frequency synthesizer 1514, a transmitter 1516, and one or more antennas 1518. However, the embodiments are not limited to these examples.

Baseband circuitry 1520, which communicates with radio interface 1510 to process receive signals and/or transmit signals, can include a unit 1522 comprising an analog-to-digital converter, a digital-to-analog converter, and a baseband or physical layer (PHY) processing circuit for physical link layer processing of receive/transmit signals. Baseband circuitry 1520 can also include, for example, a memory controller 1532 for communicating with a computing platform 1530 via an interface 1534.

Computing platform 1530, which can provide computing functionality for device 1500, can include a processor 1540 and other platform components 1750, e.g., processors, memory units, chipsets, controllers, peripherals, interfaces, input/output (I/O) components, power supplies, and the like.

Device 1500 can be, e.g., a mobile device, a smart phone, a fixed device, a machine-to-machine device, a personal digital assistant (PDA), a mobile computing device, a user equipment, a computer, a network appliance, a web appliance, consumer electronics, programmable consumer electronics, game devices, television, digital television, set top box, wireless access point, base station, subscriber station, mobile subscriber center, radio network controller, router, hub, gateway, and the like. These examples are not limiting.

Figure 12:
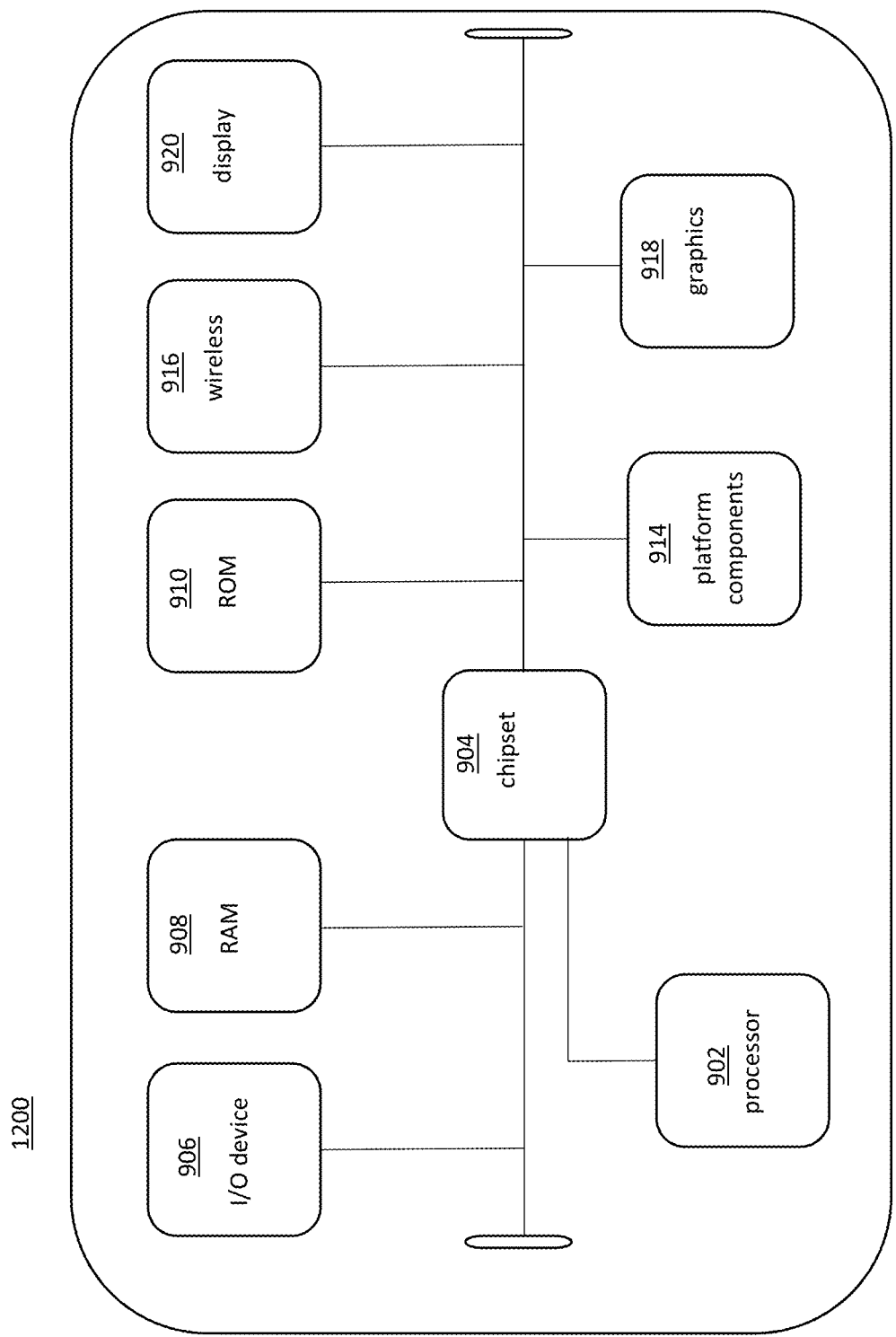
FIG. 12 is an embodiment of a system of the present disclosure.

FIG. 12 is an exemplary system embodiment configured as a platform 1200, which can include, e.g., a processor 902, a chipset 904, an I/O (input/output) device 906, a RAM (random access memory) 908, e.g., DRAM (dynamic RAM), and a ROM (read only memory) 910, a wireless communications chip 916, a graphics device 918, and a display 920, and other platform components 914 (e.g., a cooling system, a heat sink, vents, and the like), which are coupled to one another by way of a bus 312 and chipset 904. The examples are not limiting.

The techniques described herein are exemplary, and should not be construed as implying any specific limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

Some embodiments may be described using the expression "one embodiment" or "an embodiment" along with their derivatives. These terms mean that a particular feature, structure, or characteristic described in connection with the embodiment is included in at least one embodiment. The appearances of the phrase "an embodiment" in various places in the specification are not necessarily all referring to the same embodiment.

The invention claimed is:

1. A system for detecting debris in a razor cartridge comprising:
    a sensing unit configured to detect a measurement parameter comprising at least one of (i) an amount of light reflected from at least one area adjacent to at least one blade of the razor cartridge, or (ii) an image of the at least one area adjacent to at least one blade of the razor cartridge; and
    a processing unit configured to:
        (i) compare the detected measurement parameter to at least one reference threshold parameter; and
        (ii) determine a level of debris accumulation in the at least one area adjacent to the at least one blade based on an amount of deviation of the detected measurement parameter from the at least one reference threshold parameter.

2. The system according to claim 1, wherein:
    (a) the sensing unit comprises an infrared sensing unit configured to detect an amount of infrared light reflected from the at least one area adjacent to the at least one blade of the razor cartridge; and
    (b) the at least one reference threshold parameter is a specified level of reflected infrared light corresponding to a specified level of debris accumulation in the at least one area adjacent to the at least one blade.

3. The system according to claim 2, wherein the detected amount of infrared light reflected from the at least one area adjacent to the at least one blade of the razor cartridge is compared to a plurality of specified levels of reflected infrared light corresponding to a plurality of specified levels of debris accumulation in the at least one area adjacent to the at least one blade.

4. The system according to claim 1, wherein:
    (a) the sensing unit comprises an image sensor configured to detect an image of the at least one area adjacent to the at least one blade of the razor cartridge; and
    (b) the at least one reference threshold parameter is a specified level of debris accumulation in the at least one area adjacent to the at least one blade.

5. The system according to claim 4, wherein the level of debris accumulation shown in the detected image of the at least one area adjacent to the at least one blade of the razor cartridge is compared to a plurality of specified levels of debris accumulation in the at least one area adjacent to the at least one blade.

6. The system according to claim 1, further comprising:
    a notification unit including at least one of (i) a light indication unit configured to output information regarding the determined level of debris accumulation, (ii) an aural indication unit configured to output information regarding the determined level of debris accumulation, or (iii) a haptic indication unit configured to output information regarding the determined level of debris accumulation, wherein the notification unit is configured to provide an indication to rinse the razor cartridge.

7. The system according to claim 1, wherein at least one of the detected measurement parameter or the determined level of debris accumulation is transmitted to a base module external to the razor cartridge and a razor handle operatively connected to the razor cartridge via at least one of a wired connection or a wireless connection.

8. The system according to claim 1, wherein the sensing unit is provided in a base module external to the razor cartridge and a razor handle operatively connected to the razor cartridge.

9. A method comprising:
    detecting, using a sensing unit, a measurement parameter including at least one of (i) an amount of light reflected from at least one area adjacent to at least one blade of a razor cartridge, or (ii) an image of the at least one area adjacent to at least one blade of the razor cartridge;
    comparing the detected measurement parameter to at least one reference threshold parameter; and
    determining a level of debris accumulation in the at least one area adjacent to the at least one blade based on an amount of deviation of the detected measurement parameter from the at least one reference threshold parameter.

10. The method of claim 9, wherein:
    (a) the measurement parameter is an amount of infrared light reflected from the at least one area adjacent to the at least one blade of the razor cartridge and detected by an infrared sensing unit; and
    (b) the at least one reference threshold parameter is a specified level of reflected infrared light corresponding to a specified level of debris accumulation in the at least one area adjacent to the at least one blade.

11. The method of claim 10, wherein the detected amount of infrared light reflected from the at least one area adjacent to the at least one blade of the razor cartridge is compared to a plurality of specified levels of reflected infrared light corresponding to a plurality of specified levels of debris accumulation in the at least one area adjacent to the at least one blade.

12. The method of claim 9, wherein:
(a) the measurement parameter is an amount of debris accumulation present in an image of the at least one area adjacent to the at least one blade of the razor cartridge detected by an image sensor; and
(b) the at least one reference threshold parameter is a specified level of debris accumulation in the at least one area adjacent to the at least one blade.

13. The method of claim 12, wherein the amount of debris accumulation present in the detected image of the at least one area adjacent to the at least one blade of the razor cartridge is compared to a plurality of specified levels of debris accumulation in the at least one area adjacent to the at least one blade.

14. The method of claim 9, further comprising:
providing an output information regarding the determined level of debris accumulation by a notification unit including at least one of (i) a light indication unit, (ii) an aural indication unit, or (iii) a haptic indication unit, wherein the output information includes an indication to rinse the razor cartridge.

15. The method of claim 9, wherein at least one of the detected measurement parameter or the determined level of debris accumulation is transmitted to a base module external to the razor cartridge and a razor handle operatively connected to the razor cartridge via at least one of a wired connection or a wireless connection.

16. The method of claim 9, wherein the sensing unit is provided in a base module external to the razor cartridge and a razor handle operatively connected to the razor cartridge.

* * * * *